US012596410B2

(12) United States Patent (10) Patent No.: US 12,596,410 B2
Yang et al. (45) Date of Patent: Apr. 7, 2026

(54) PORTABLE ELECTRONIC DEVICE

(71) Applicant: LG ELECTRONICS INC., Seoul (KR)

(72) Inventors: Hyunsuk Yang, Seoul (KR); Yongjin Hwang, Seoul (KR); Donghyok Shin, Seoul (KR); Peelhyuk Lim, Seoul (KR); Bongjun Jae, Seoul (KR); Byeongduk An, Seoul (KR); Dongjoon Choi, Seoul (KR); Laio Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 18/519,702

(22) Filed: Nov. 27, 2023

(65) Prior Publication Data

US 2024/0219975 A1 Jul. 4, 2024

(30) Foreign Application Priority Data

Dec. 28, 2022 (KR) ........................ 10-2022-0187708
Jul. 14, 2023 (KR) ........................ 10-2023-0091995

(51) Int. Cl.
*G06F 1/16* (2006.01)
(52) U.S. Cl.
CPC .......... *G06F 1/1681* (2013.01); *G06F 1/1652* (2013.01)
(58) Field of Classification Search
CPC .... G06F 1/1681; G06F 1/1652; G06F 1/1616; G06F 1/1641
See application file for complete search history.

(56) References Cited

U.S. PATENT DOCUMENTS 9,348,450 B1 * 5/2016 Kim ..................... H04M 1/0268
9,535,452 B2 * 1/2017 Ahn ...................... G06F 1/1652
9,557,771 B2 * 1/2017 Park .................... H04M 1/0237
9,614,168 B2 * 4/2017 Zhang .................. H10K 85/141
9,798,359 B2 * 10/2017 Seo ....................... G06F 1/1652
11,016,530 B2 * 5/2021 Watamura ............. G06F 1/1652
11,886,257 B2 * 1/2024 Kim ...................... H04M 1/022
11,917,780 B2 * 2/2024 Caplow-Munro ... H05K 5/0226
11,933,351 B2 * 3/2024 Jiang ....................... F16C 11/04
11,960,332 B2 * 4/2024 Huang .................. G06F 1/1681
12,035,608 B2 * 7/2024 Kim ...................... G06F 1/1652
12,079,039 B2 * 9/2024 Kishimoto ............ G06F 1/1616
12,153,475 B2 * 11/2024 Zhao ..................... G06F 1/1681
12,161,042 B2 * 12/2024 Park ....................... G09F 9/301
12,226,985 B2 * 2/2025 Song .................... B32B 15/082

(Continued)

*Primary Examiner* — Rockshana D Chowdhury
(74) *Attorney, Agent, or Firm* — Birch, Stewart, Kolasch & Birch, LLP

(57) ABSTRACT

A portable electronic device includes a first frame, a second frame, a flexible display fixed to the first frame and fixed to the second frame, a hinge connected between the first frame and the second frame, the hinge being configured to control an angle between the first frame and the second frame; and an angle limiter for limiting the angle between the first frame and the second frame. The angle limiter includes a first stopper bracket coupled to the first frame, and a second stopper bracket coupled to the second frame. The first stopper bracket is spaced apart from the second stopper bracket in a closed state of the portable electronic device, and comes into contact with the second stopper bracket in an open state of the portable electronic device.

20 Claims, 11 Drawing Sheets

(56)          References Cited

U.S. PATENT DOCUMENTS

| | | | | |
|---|---|---|---|---|
| 2016/0357052 | A1* | 12/2016 | Kim | H10K 59/87 |
| 2018/0151644 | A1* | 5/2018 | Han | G09G 3/3225 |
| 2018/0324964 | A1* | 11/2018 | Yoo | G06F 1/1698 |
| 2019/0033920 | A1* | 1/2019 | Yun | G06F 1/1641 |
| 2019/0204867 | A1* | 7/2019 | Song | G09G 3/3208 |
| 2019/0305238 | A1* | 10/2019 | Shin | H10K 59/87 |
| 2019/0334114 | A1* | 10/2019 | Park | H10K 50/8426 |
| 2020/0209998 | A1* | 7/2020 | Shin | G06F 1/1641 |
| 2020/0267244 | A1* | 8/2020 | Kim | G06F 1/1641 |
| 2020/0267859 | A1* | 8/2020 | Kim | G06F 1/1641 |
| 2020/0293094 | A1* | 9/2020 | Liu | F16M 11/04 |
| 2020/0348732 | A1* | 11/2020 | Kang | E05D 3/122 |
| 2021/0141418 | A1* | 5/2021 | Min | G06F 1/1637 |
| 2021/0217975 | A1* | 7/2021 | Gu | G09F 9/30 |
| 2021/0247814 | A1* | 8/2021 | Nguyen | G06F 1/1616 |
| 2022/0075411 | A1* | 3/2022 | Lee | G06F 1/1616 |
| 2022/0129094 | A1* | 4/2022 | Tatsuno | G06F 3/04162 |
| 2022/0404877 | A1* | 12/2022 | Sakamoto | G06F 1/1643 |
| 2023/0161377 | A1* | 5/2023 | Lee | G09F 9/301 |
| | | | | 361/679.01 |
| 2023/0247778 | A1* | 8/2023 | Kim | B32B 5/12 |
| | | | | 361/807 |
| 2023/0409091 | A1* | 12/2023 | Kim | G06F 1/1616 |
| 2024/0221542 | A1* | 7/2024 | Li | G09F 9/301 |
| 2025/0040067 | A1* | 1/2025 | Choi | H05K 5/0217 |
| 2025/0048571 | A1* | 2/2025 | Choi | G06F 1/1681 |
| 2025/0113450 | A1* | 4/2025 | Kim | H05K 5/0226 |
| 2025/0126729 | A1* | 4/2025 | Kim | G06F 1/1652 |

* cited by examiner (a)

(b)

(a)

(b)

(a)

(b)

PORTABLE ELECTRONIC DEVICE

CROSS-REFERENCE TO RELATED APPLICATIONS

This application claims the priority benefit of Korean Patent Application No. 10-2022-0187708 filed in the Republic of Korea on Dec. 28, 2022, and Korean Patent Application No. 10-2023-0091995 filed in the Republic of Korea on Jul. 14, 2023, which are hereby incorporated by reference as if fully set forth herein.

BACKGROUND OF THE INVENTION

1. Field of the Invention

The present disclosure relates to a portable electronic device for preventing reverse folding of the foldable portable electronic device and preventing damage to a display due to impacts.

2. Description of the Related Art

A portable electronic device is becoming commonplace in modern society because it can be easily carried by anyone and can be used freely anywhere, and types thereof are diversifying. The portable electronic device can include a portable computer including a laptop PC, a palmtop PCs, or a PDA, a mobile communication device, a game console, an audio, or video player (an MP3 player and a portable media player (PMP)), and the like.

Such portable electronic device can include a display device to provide visual information or various user interfaces. When a multimedia function is a main function, a size of a display can be maximized, and a user input can be received using a keypad or an interface output on the display. When an input function such as a document creation function is important, a separate user input device can be disposed to increase input convenience.

As the portable electronic device diversifies in functions and a frequency of use thereof increases, a foldable electronic device that is in a foldable form to expand an actual usable area size in a limited size is widely used.

As a representative example, the portable computer referred to as the laptop can be mentioned, and in addition, an electronic device having the display on each of both sides is also commercialized and used.

A form that has two bodies and is folded when carried and unfolded during use as such is classified into a foldable or clamshell form and has a hinge such that an angle of the two bodies can be freely adjusted.

Recently, it is possible to implement portable electronic devices with thin and large screens using organic light emitting diodes (OLED), and furthermore, provide electronic devices with foldable displays.

However, portable electronic devices with large screen displays often face constraints due to limited space for accommodating other components, and difficulties in ensuring rigidity as the devices become thinner.

SUMMARY OF THE DISCLOSURE

Accordingly, the present disclosure is directed to a portable electronic device that substantially obviates one or more problems due to limitations and disadvantages of the related art.

An object of the present disclosure is to provide a portable electronic device for preventing reverse folding of the foldable portable electronic device and preventing damage to a display due to impacts.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, there is provided a portable electronic device. The portable electronic device includes: a first frame and a second frame arranged side by side in a first direction in an open state; a hinge disposed between the first and second frames and configured to control an angle between the first and second frames; and an angle limiter configured to limit the angle between the first and second frames, wherein the angle limiter includes a pair of stopper brackets coupled to the first and second frames, respectively. Each of the pair of stopper brackets includes: a first stopper that comes into contact with another first stopper in a thickness direction in the open state; and a second stopper that comes into contact with another second stopper in the first direction in the open state.

The first stopper can include: a stopper hook located on a first side of each of the pair of stopper brackets and bent towards one surface of the frame; and a stopper bump located on a second side of each of the pair of stopper brackets and in contact with the stopper hook.

The angle limiter can include a pair of first stoppers, and the pair of first stoppers can be arranged at a distance in a second direction perpendicular to the first direction.

Each of the pair of stopper brackets can include one stopper hook and one stopper bump. The stopper hook of one stopper bracket can protrude further towards the paired stopper bracket than the stopper bump.

A line connecting an end of the stopper hook and an end of the stopper bump can be parallel to a first surface of the first and second frames in the open state.

The second stopper can be located between the pair of first stoppers.

The pair of stopper brackets can have a same shape but different orientations by 180 degrees.

The second stopper can include a supporting surface formed on each of the pair of stopper brackets, and the supporting surfaces formed on the pair of stopper brackets can come into contact with each other in the open state. The stopper hook of one stopper bracket can protrude further towards the paired stopper bracket than the supporting surface.

The supporting surface can protrude further towards a second surface of the first and second frames than the stopper hook.

Each of the pair of stopper brackets can include: screw holes for attaching to the first and second frames; and alignment protrusions inserted into guide holes formed in the first and second frames.

The portable electronic device can further include a flexible display fixed to a first surface of the first and second frames and covering one surface of the hinge and one surface of the angle limiter, wherein the flexible display includes a foldable portion with varying curvature.

According to at least one embodiment of the present disclosure, it is possible to prevent the angle between a pair of frames and from increasing beyond 180 degrees, thereby preventing a foldable portion of a display from being damaged due to excessive pressure applied in a front direction.

Additionally, it is also possible to prevent damage to the display due to an impact in a first direction by eliminating a gap between the pair of frames arranged side by side in the first direction.

Further scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The present invention will become more fully understood from the detailed description given hereinbelow and the accompanying drawings which are given by way of illustration only, and thus are not limitative of the present invention.

Figure 7:
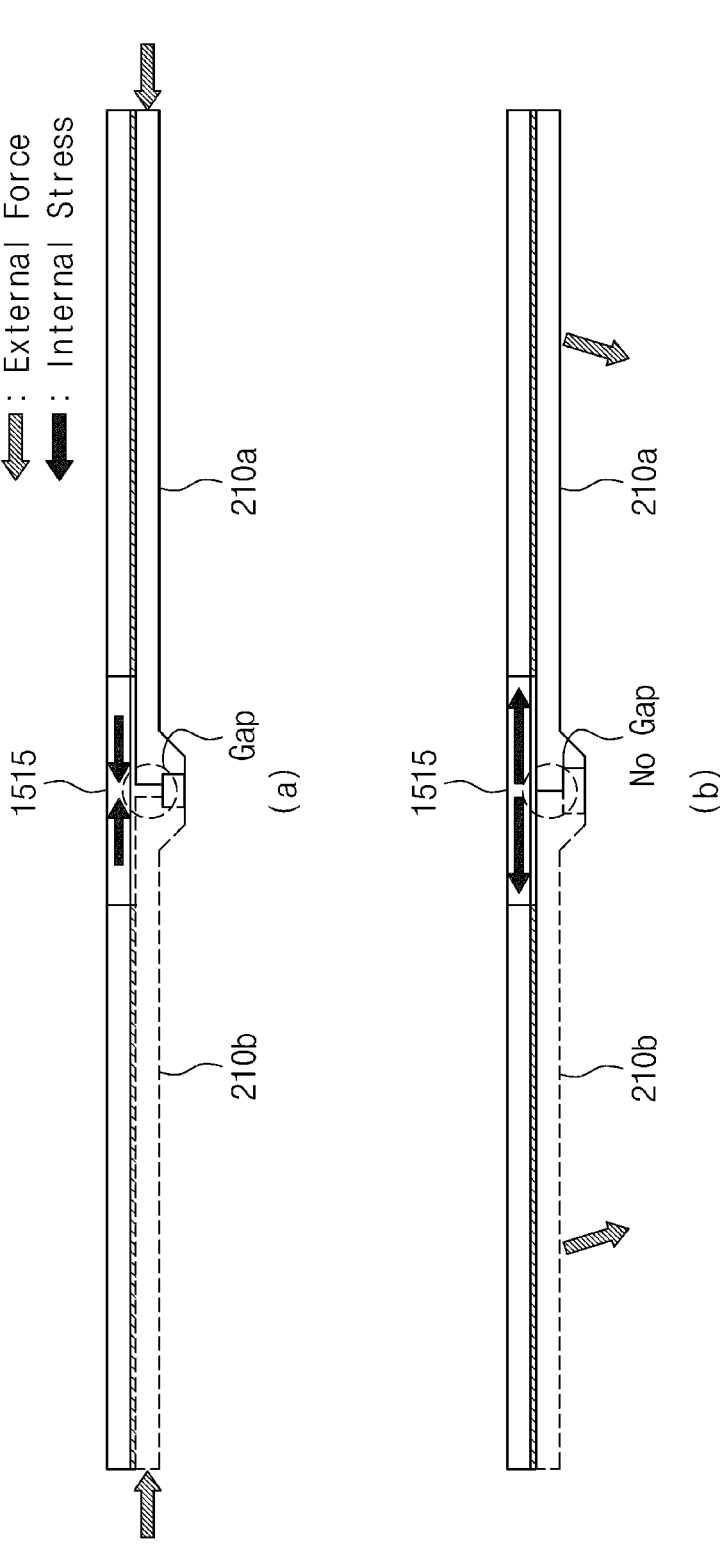

(a) and (b) of FIG. 7 are views for explaining damage to a foldable portion depending on the types of hinge modules of a portable electronic device according to an embodiment of the present disclosure.

Figure 8:
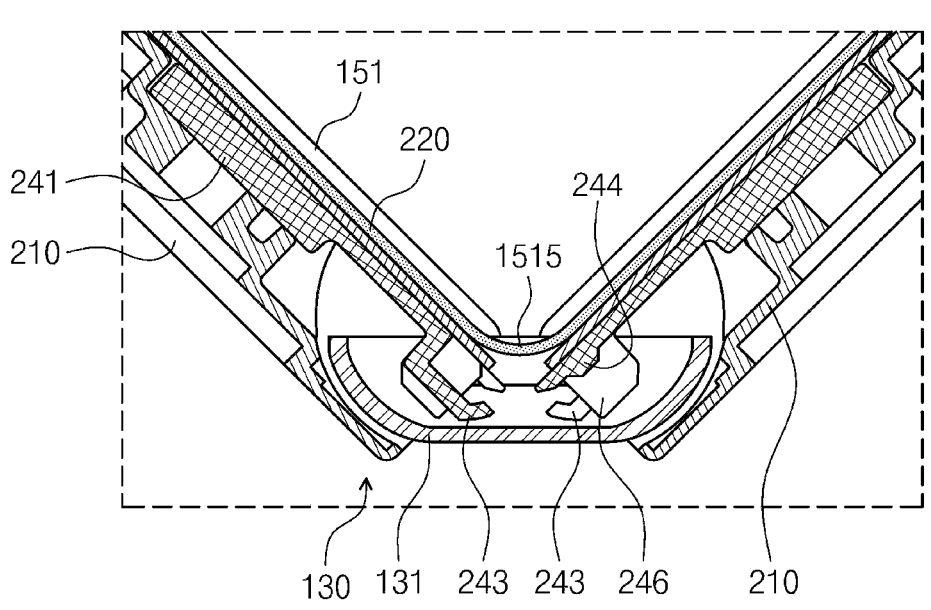

FIG. 8 is a view illustrating a second state of a connecting portion of a portable electronic device according to an embodiment of the present disclosure.

Figure 9:
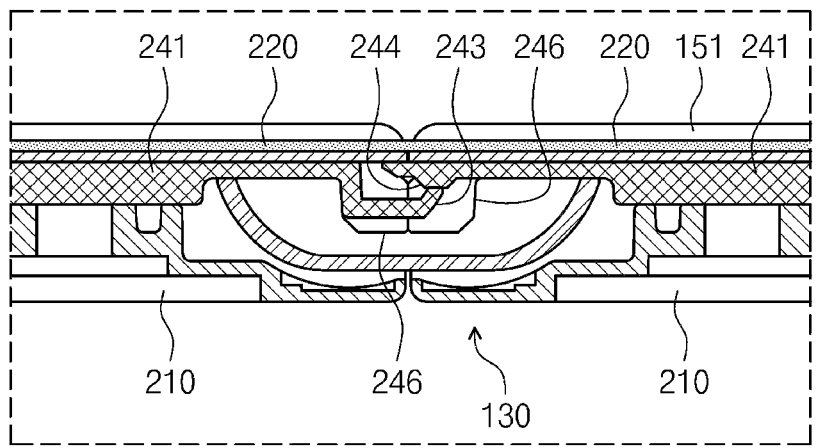

FIG. 9 is a view illustrating a third state of a connecting portion of a portable electronic device according to an embodiment of the present disclosure.

Figure 10:
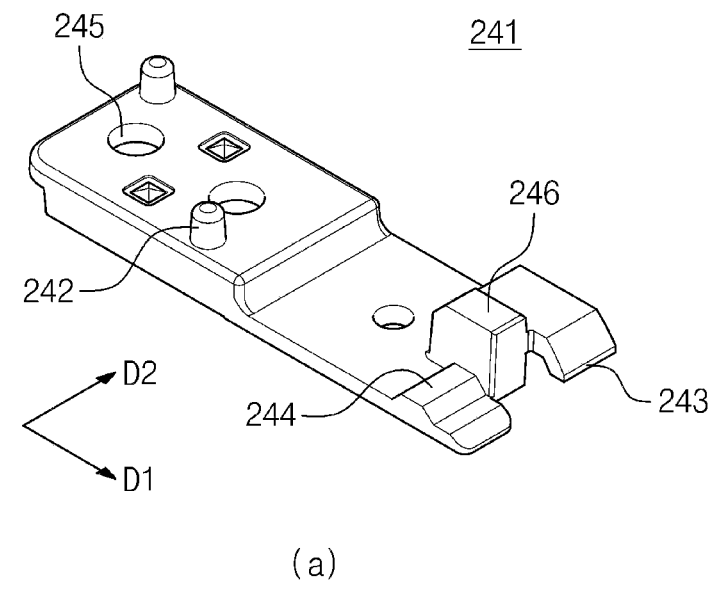
Figure 10:
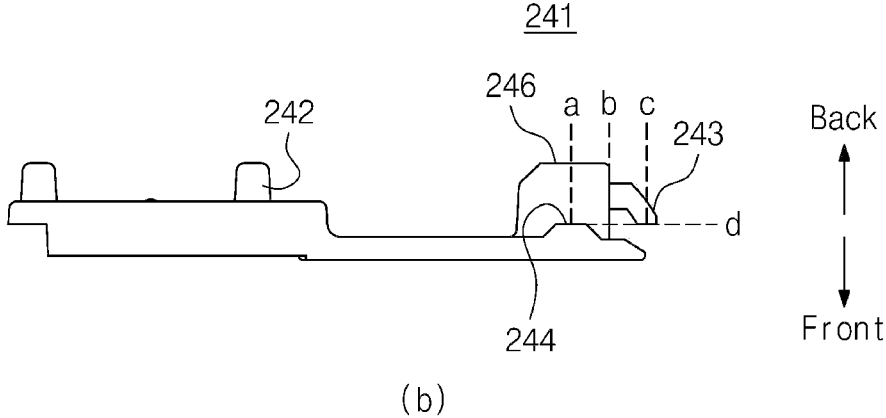

(a) and (b) of FIG. 10 are views illustrating a stopper bracket of a portable electronic device according to an embodiment of the present disclosure.

Figure 11:
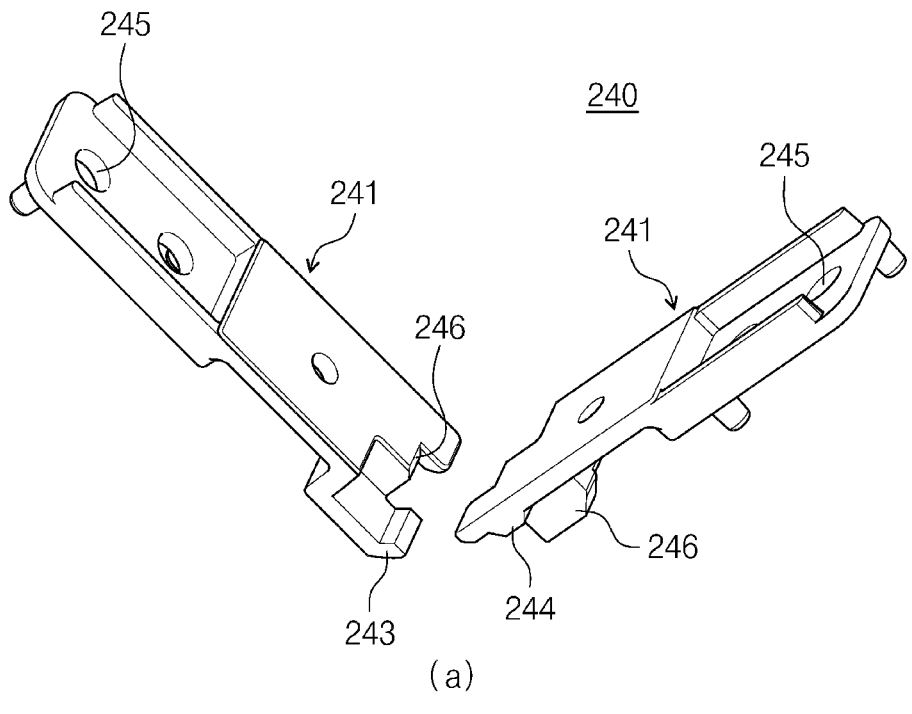
Figure 11:
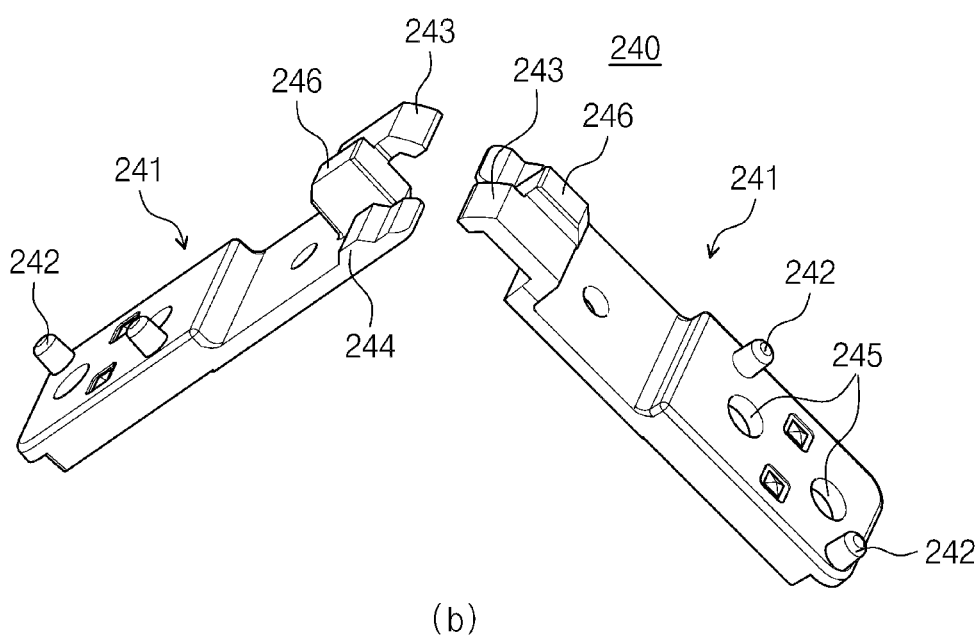

(a) and (b) of FIG. 11 are views illustrating a second state of an angle-limiting module of a portable electronic device according to an embodiment of the present disclosure.

Figure 12:
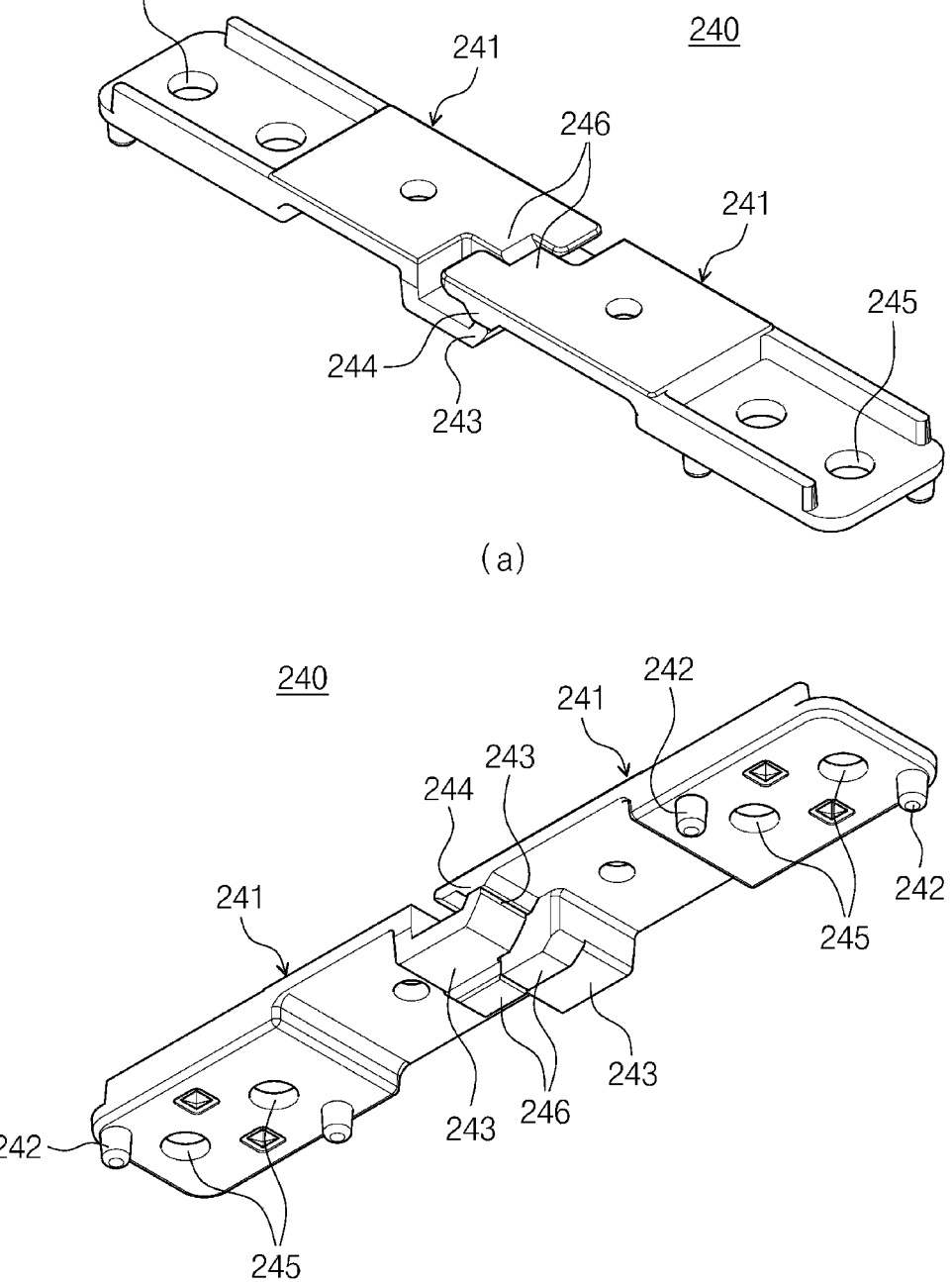

(a) and (b) of FIG. 12 are views illustrating a third state of an angle-limiting module of a portable electronic device according to an embodiment of the present disclosure.

DETAILED DESCRIPTION

Description will now be given in detail according to exemplary embodiments disclosed herein, with reference to the accompanying drawings. For the sake of brief description with reference to the drawings, the same or equivalent components can be provided with the same reference numbers, and description thereof will not be repeated. In general, a suffix such as "module" and "unit" can be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

It will be understood that although the terms first, second, etc. can be used herein to describe various elements, these elements should not be limited by these terms. These terms are generally only used to distinguish one element from another.

It will be understood that when an element is referred to as being "connected with" another element, the element can be directly connected with the other element or intervening elements can also be present. In contrast, when an element is referred to as being "directly connected with" another element, there are no intervening elements present.

A singular representation can include a plural representation unless it represents a definitely different meaning from the context.

Terms such as 'including,' 'having,' 'comprising,' 'consist of,' etc. are used herein and should be understood that they are intended to indicate an existence of several components, functions, or steps, disclosed in the specification, and it is also understood that greater or fewer components, functions, or steps can likewise be utilized. Further, the term "exemplary" has the same or similar meaning as and is interchangeably used with the term "example."

Mobile terminals presented herein can be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, and the like.

Figure 1:
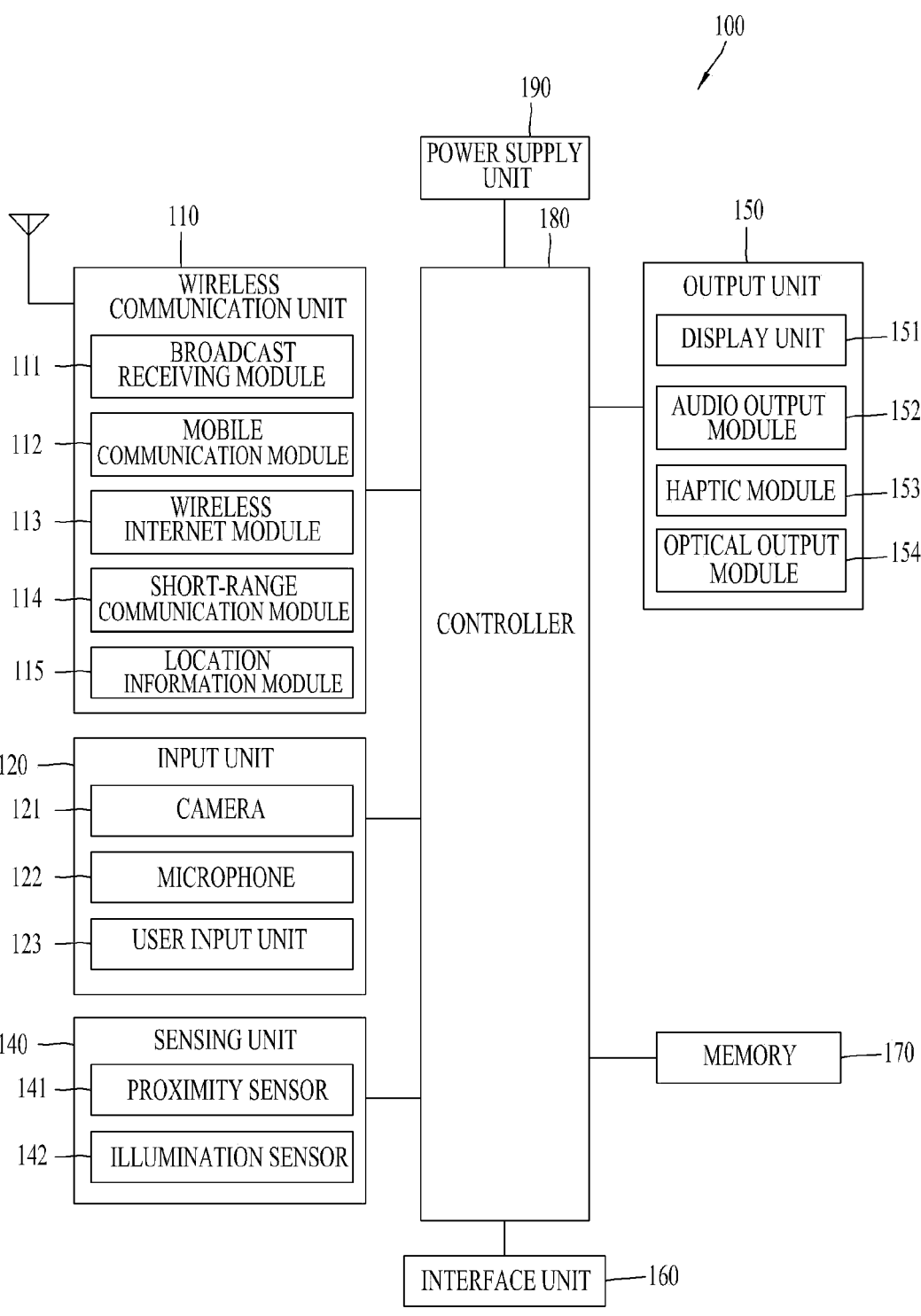
FIG. 1 is a block diagram of a portable electronic device in accordance with the present disclosure.

FIG. 1 is a block diagram of a portable electronic device in accordance with the present disclosure The portable electronic device 100 is shown having components, such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components can alternatively be implemented than the components listed above.

More specifically, the wireless communication unit 110 typically includes one or more modules which permit communications, such as wireless communications between the portable electronic device 100 and a wireless communication system, communications between the portable electronic device 100 and another portable electronic device, communications between the portable electronic device 100 and an external server. Further, the wireless communication unit 110 typically includes one or more modules which connect the portable electronic device 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining (i.e., capturing) images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and can be analyzed and processed as a user's control command, for example, via a hardware-embedded processor.

The sensing unit 140 is typically implemented using one or more sensors configured to sense internal information of the portable electronic device, the surrounding environment of the portable electronic device, user information, and the like. For example, the sensing unit 140 can alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The portable electronic device 100 can be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display 151, an audio output module 152, a haptic module 153, and an optical output module 154. The display 151 can have an inter-layered structure or an integrated structure with a touch sensor in order to facilitate a touch screen. The touch screen can provide an output interface between the portable electronic device 100 and a user, as well as function as the user input unit 123 which provides an input interface between the portable electronic device 100 and the user.

The interface unit 160 serves as an interface with various types of external devices that can be coupled to the portable electronic device 100. The interface unit 160, for example, can include any of wired or wireless ports, external power supply ports, wired or wireless data ports, memory card ports, ports for connecting a device having an identification module, audio input/output (I/O) ports, video I/O ports, earphone ports, and the like. In some cases, the portable electronic device 100 can perform assorted control functions associated with a connected external device, in response to the external device being connected to the interface unit 160.

The memory 170 is typically implemented to store data to support various functions or features of the portable electronic device 100. For instance, the memory 170 can be configured to store application programs executed in the portable electronic device 100, data or instructions for operations of the portable electronic device 100, and the like. Some of these application programs can be downloaded from an external server via wireless communication. Other application programs can be installed within the portable electronic device 100 at time of manufacturing or shipping, which is typically the case for basic functions of the portable electronic device 100 (for example, receiving a call, placing a call, receiving a message, sending a message, and the like). It is common for application programs to be stored in the memory 170, installed in the portable electronic device 100, and executed by the controller 180 to perform an operation (or function) for the portable electronic device 100.

The controller 180 typically functions to control overall operation of the portable electronic device 100, in addition to the operations associated with the application programs. The controller 180 can provide or process information or functions appropriate for a user by processing signals, data, information and the like, which are input or output, or activating application programs stored in the memory 170.

To drive the application programs stored in the memory 170, the controller 180 can be implemented to control a predetermined number of the components mentioned above in reference with FIG. 1. Moreover, the controller 180 can be implemented to combinedly operate two or more of the components provided in the portable electronic device 100 to drive the application programs.

The power supply unit 190 can be configured to receive external power or provide internal power in order to supply appropriate power required for operating elements and components included in the portable electronic device 100. The power supply unit 190 can include a battery, and the battery can be configured to be embedded in the terminal body or configured to be detachable from the terminal body.

Some or more of the components can be operated cooperatively to embody an operation, control, or a control method of the portable electronic device in accordance with embodiments of the present disclosure. Also, the operation, control or control method of the portable electronic device can be realized on the portable electronic device by driving of one or more application problems stored in the memory 170.

Figure 2:
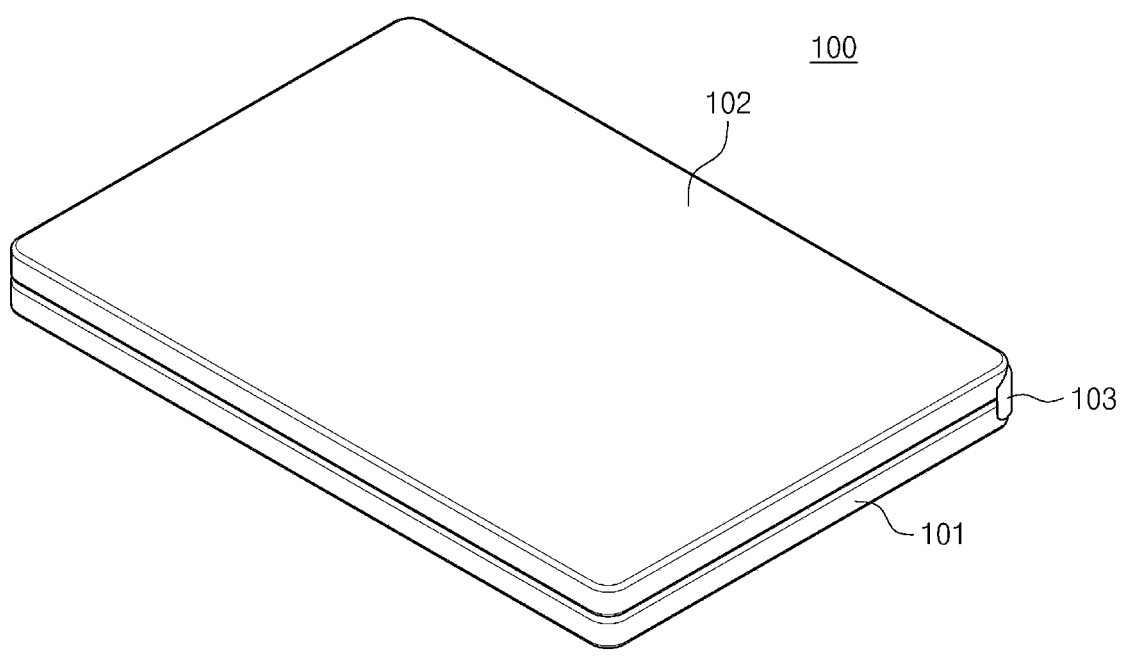
FIG. 2 is a perspective view showing a closed state of a portable electronic device according to an embodiment of the present disclosure.
Figure 3:
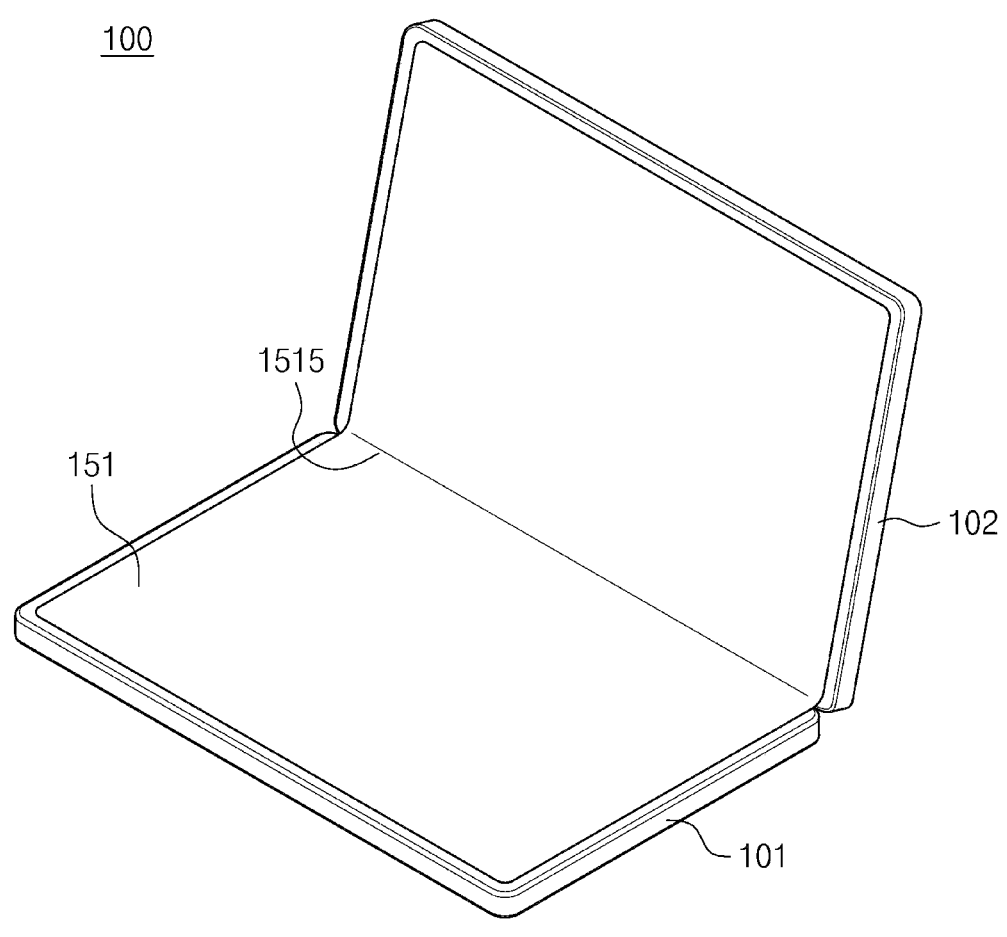
FIGS. 3 and 4 are perspective views showing an open state of a portable electronic device according to an embodiment of the present disclosure.
Figure 4:
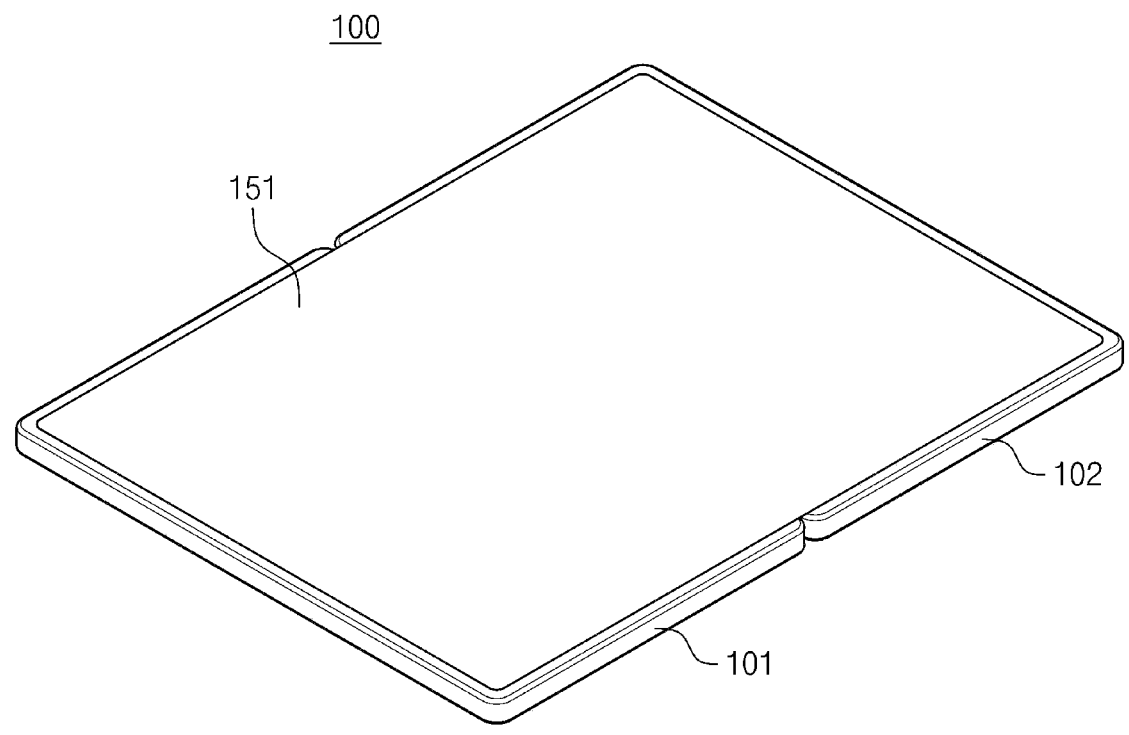

FIG. 2 is a perspective view showing a closed state of the portable electronic device 100 according to one aspect of the present disclosure, and FIGS. 3 and 4 are perspective views showing an open state of the portable electronic device 100 shown in FIG. 2.

The portable electronic device 100 according to the present disclosure includes a pair of bodies (a first body 101 and a second body 102). Additionally, the portable electronic device 100 includes a connecting portion 130 that connects the first body 101 and the second body 102 to each other such that an angle between the first body 101 and the second body 102 can be varied. Additionally, the portable electronic device 100 can include the display 151 that covers respective surfaces on one side of the pair of bodies 101 and 102 and outputs an image. The portable electronic device 100 according to the present disclosure is composed of the pair of bodies 101 and 102, and the first body 101 and the second body 102 are coupled to pivot via the connecting portion 130, the connecting portion 130 including a hinge module 230. A hinge module 230 can be composed of a pair of hinge axes such that the pair of bodies maintains the angle therebetween while operating symmetrically.

The hinge module 230 can vary the angle between the first body 101 and the second body 102 and spread to form a predetermined angle between the first body 101 and the second body 102 as shown in FIGS. 3 and 4, thereby switching from a closed state in which the second body 102 is disposed to overlap one surface of the first body 101 as shown in FIG. 2 to an open state.

FIG. 4 shows a fully open state to achieve 180 degrees, and FIG. 3 shows a partially open state with about 100 degrees. For convenience of description below, a state in which the portable electronic device 100 is closed as shown in FIG. 2 is referred to as a first state. A state in which the portable electronic device 100 is open at an angle greater than 0 degrees but less than 180 degrees as shown in FIG. 3 is referred to as a second state. A state in which the portable electronic device 100 is fully open at an angle of 180 degrees as shown in FIG. 3 is referred to as a third state.

When being carried, the device can be used in the closed state as shown in FIG. 2, and when in use, the second body 102 can be disposed slightly tilted backward from a vertical direction as shown in FIG. 3, so that a portion of the display 151 located on one surface of the second body 102 is disposed perpendicular to a line of sight of a user.

The display 151 that covers the respective surfaces of the first body 101 and the second body 102 on one side can be made of a flexible material, such as organic light-emitting diodes (OLED) or the flexible display 151. The display 151 is made of the flexible material.

The flexible display 151 is able to be folded as a foldable portion 1515 is bent in the closed state as shown in FIG. 2. The foldable portion 1515 can be curved with a predetermined curvature, and the connecting portion 130 can provide a predetermined space where the curved display 151 can be located.

In the state shown in FIG. 3, the portion of the display 151 located on the second body 102 can be used as a monitor as the output unit, and a portion of the display 151 located on the first body 101 can be used as a touchpad or a keyboard. Alternatively, a separate keyboard can be seated, and the device can be used in a form similar to a typical laptop.

Alternatively, as shown in FIG. 4, the first body 101 and the second body 102 can be opened to form 180 degrees, so that the device can be used in a tablet-like form or as a large-screen monitor. The display 151 according to the present disclosure may not only be flexible but can also include a touch electrode to enable touch input.

Figure 5:
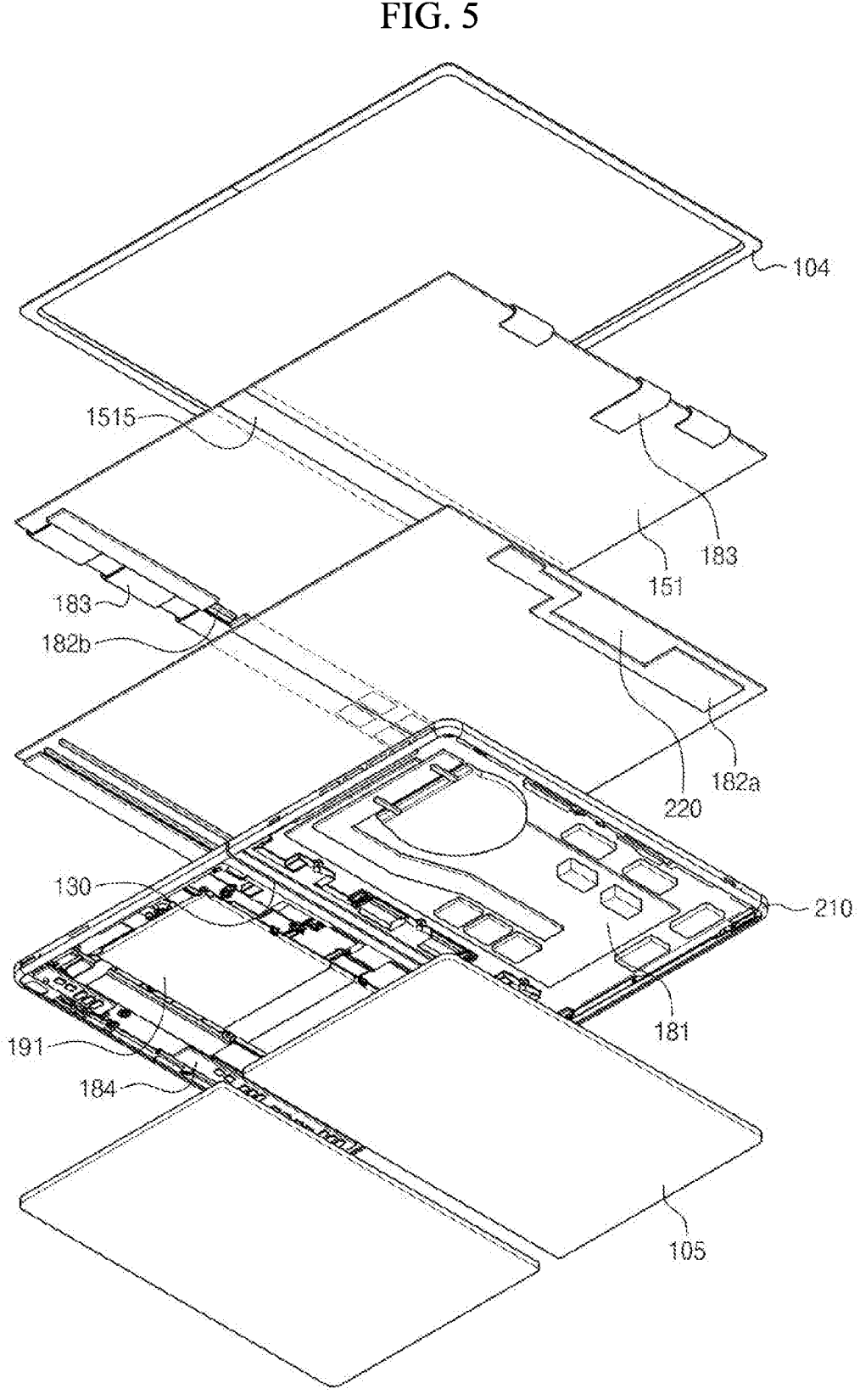
FIG. 5 is an exploded perspective view of a portable electronic device according to an embodiment of the present disclosure.

FIG. 5 is an exploded perspective view of a portable electronic device according to one aspect of the present disclosure. The portable electronic device 100 according to the present disclosure can include the flexible display 151, a bezel decor supporting a front surface perimeter of the flexible display 151, a shutter frame 220 located on a back surface of the display 151, a middle frame 210 on which a main board 181 and a battery 191 are seated, and a back cover that covers electrical components of the middle frame 210.

The middle frame 210 includes a first frame 210a and a second frame 210b arranged in parallel in a first direction. The first frame 210a can constitute a first body 101, and the second frame 210b can constitute a second body 102. The connecting portion 130 between a pair of frames: first and second frames 210a and 210b can be implemented as a hinge module to allow for adjustable angles.

The display 151 is located on one side of the connecting portion 130. The other side of the connecting portion 130 is covered by the first frame 210a and the second frame 210b in the third state, as shown in FIG. 5. When the portable electronic device is folded in the first state, the connecting portion 130 can be exposed. Thus, a hinge cover covering the connecting portion 130 can be positioned on the other side of the connecting portion 130.

The flexible display 151 can have a size that simultaneously covers the first body 101 and the second body 102 and can include the flexible organic light-emitting diodes (OLED). An inner plate, a thin metal plate, can be added to the back surface of the display 151 for rigidity. The inner plate is thin enough to be bendable and has a certain level of rigidity, thereby supporting a back surface of the organic light-emitting diodes.

The flexible display 151 can include a fixed portion fixed to the middle frame 210 and the foldable portion 1515 bendable to change a curvature thereof in the first direction. Even though the entire flexible display 151 is composed of the bendable organic light-emitting diodes, a radius of curvature of the bendable foldable portion is increased by the inner plate attached to the back surface.

To reduce the radius of curvature, that is, to increase the curvature, of the foldable portion, the inner plate can include a plurality of slits extending in a second direction perpendicular to the first direction in an area corresponding to the foldable portion 1515. The plurality of slits can be arranged consecutively in the second direction, and slits adjacent to each other in the first direction can be arranged in a zigzag manner such that ends thereof are misaligned with each other.

The display 151 can have transparent electrodes arranged in a grid and can include a display panel 182b to apply a signal for outputting an image to the transparent electrodes. The display panel 182b can connect the main board and the flexible display 151 to each other to apply power to the transparent electrodes of the display 151 in response to an image signal provided from the main board 181.

As shown in FIG. 5, the display 151 can be connected to the main board 181 at an end thereof in the first direction via a flexible substrate 183. The flexible substrate 183 is made of a bendable film material. The flexible substrate 183 can be bent to place the display panel 182b on the back surface of the display 151, and then the display panel 182b can be connected to the main substrate 181.

The flexible display 151 can further include a touch sensor to enable the touch input. A touch panel 182a can be further included to transmit the input sensed by the touch sensor to the main board 181. To avoid overlapping arrangement with the display panel 182b, the touch sensor can be located at the other end in the first direction of the display 151 opposite to the side where the display panel 182b is located.

The display panel 182b and the touch panel 182a are components that are connected to the flexible display 151 and are hereinafter referred to as a sub-board 182. In the drawing, the touch panel 182a is shown as being located in the first body 101 where the main board 181 is mounted, and the display panel 182b is shown as being located in the second body 102 where the battery 191 is mounted, but the locations thereof can be interchanged.

The middle frame 210 located on the back surface of display 151 can be divided into a first middle frame 210a and a second middle frame 210b to form the first body 101 and the second body 102 described above, respectively. The middle frame 210 can include a back mounting portion 211 that has rigidity and is a space in a back surface where components such as the main board 181 and the battery 191 can be seated.

A back cover 105 that is coupled to the back surface of the middle frame 210 and covers the components mounted in the middle frame 210. The back cover 105 forms an outer appearance of the display 151 device in a first state in which the portable electronic device 100 is closed.

The portable electronic device 100 according to the present disclosure can further include the shutter frame 220 between the flexible display 151 and the middle frame 210. The shutter frame 220 is a plate-shaped member that is thinner than the middle frame 210 and is able to be coupled to the back surface of the display unit 151.

The shutter frame 220 can also be divided into two, corresponding to a portion where a first frame and a second frame are separated from each other. Because the shutter frame 220 is thin but has rigidity, the shutter frame 220 can be coupled to the back surface of the display 151, excluding the foldable portion, and can be separated from the foldable portion when the foldable portion 1515 of the flexible display 151 is bent.

Through the shutter frame 220, electronic components can be mounted not only on the rear surface of the middle frame 210 but also on the front surface thereof. For example, components such as a display board 182a connected to one side of the display 151, a touch panel 182b for touch input, and the like can be attached to the rear surface of the shutter frame 220 and positioned on the front surface of the middle frame 210.

Figure 6:
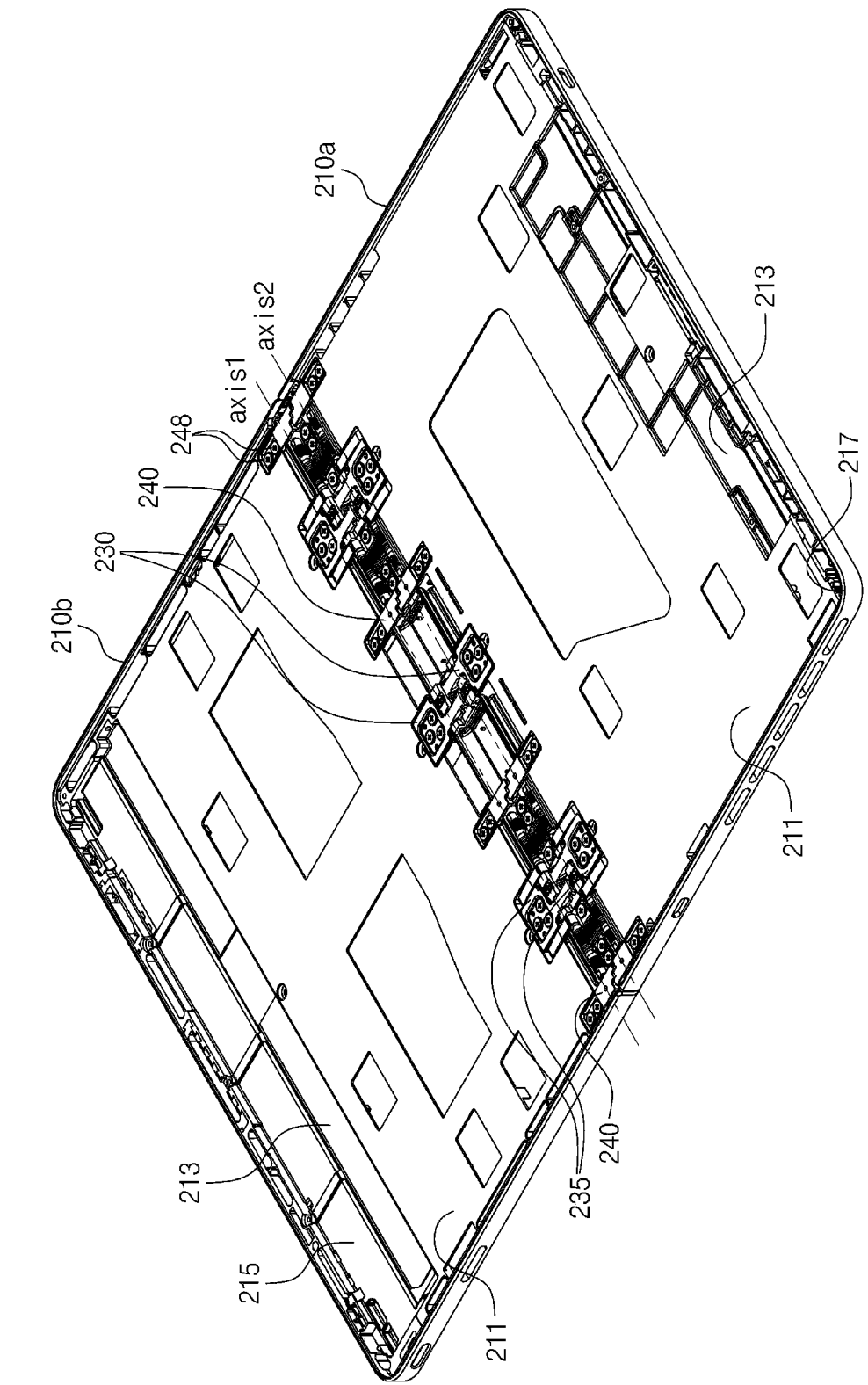
FIG. 6 is a front perspective view illustrating a middle frame of a portable electronic device according to an embodiment of the present disclosure.

FIG. 6 is a front perspective view illustrating the middle frame 210 of the portable electronic device 100 according to one aspect of the present disclosure. The connecting portion 130 can include the hinge module 230 that supports the rear surface of the display 151 at a position corresponding to the foldable portion 1515 of the display 151.

Two hinge brackets 235 of the hinge module 230 are connected to the first frame 210a and the second frame 210b, respectively. As the angle of the pair of hinge brackets 235 changes, the angle between the first body 101 and the second body 102 changes.

The foldable portion 1515 whose curvature changes is located on the front surface of the hinge module 230. The hinge module 230 can have a double-axis structure that operates symmetrically around two axes to provide a certain amount of space for the foldable portion 1515 to remain unfolded and maintain its curvature in the first state.

A plurality of hinge modules 230 can be provided as shown in FIG. 6. The plurality of hinge modules 230 can be arranged such that the hinge modules 230 are spaced apart in the second direction perpendicular to the first direction in which the pair of bodies are arranged. The hinge module 230 has a complex structure to allow the pair of bodies to perform rotational motion and be fixed at angles within 180 degrees.

(a) and (b) of FIG. 7 are views illustrating the vulnerability of the display 151 at the connecting portion 130 of the foldable portable electronic device 100. (a) of FIG. 7 shows a case where the pair of frames 210a and 210b are spaced apart to prevent interference during the rotation of the pair of frames 210a and 210b, and (b) of FIG. 7 shows a case where there is no gap between the hinge brackets 235 for stable fixation in the third state where the angle between the pair of bodies is 180 degrees.

Since the portable electronic device 100 is designed for portability, the portable electronic device 100 can be dropped or bumped while in the unfolded state during movement. In this case, there can be an impact in the first direction (horizontal direction in (a) FIG. 7). In addition, if there is a gap between the pair of frames 210a and 210b as shown in (a) of FIG. 7, the gap can narrow, exerting force in the direction of contraction onto the foldable portion 1515 of the display 151, which can potentially lead to damage of the foldable portion 1515.

On the other hand, if there is no gap between the pair of frames 210a and 210b as shown in (b) of FIG. 7, even when an impact is applied in the first direction, the gap between the pair of frames remains unchanged, thereby preventing damage to the display 151.

When the portable electronic device 100 is in the third state, a user can exert pressure to the outer sides of the pair of bodies toward the back so that the portable electronic device 100 is bent beyond 180 degrees. In this case, if a gap is formed between the pair of frames 210a and 210b as shown in (a) of FIG. 7, the gap between the pair of frames 210a and 210b becomes shorter, thereby allowing for an angle change and preventing the application of tensile force on the foldable portion 1515 of the display 151. On the other hand, if there is no gap between the hinge brackets 235 as shown in (b) of FIG. 7, tensile force can be applied to the foldable portion 1515 of the display 151, which potentially leads damage to the foldable portion 1515.

In other words, the foldable portion 1515 of the display 151, which includes the connecting portion 130 connecting the pair of frames 210a and 210b, can be damaged by the two mentioned external forces. According to the present disclosure, the portable electronic device 100 can include an angle-limiting module 240 capable of preventing damage to the foldable portion 1515 in the following cases: when an impact is applied in the first direction; and when the portable electronic device 100 is folded beyond 180 degrees.

The angle-limiting module 240 can be positioned between the hinge modules 230 as shown in FIG. 6. The angle-limiting module 240 can include a pair of stopper brackets 241, which are coupled to the first frame 210a and second frame 210b, respectively.

FIG. 8 is a view illustrating the second state of the connecting portion 130 of the portable electronic device 100 according to one aspect of the present disclosure, and FIG. 9 is a view illustrating the third state of the connecting portion 130 of the portable electronic device 100 according to one aspect of the present disclosure.

The pair of stopper brackets 241 are spaced apart not only in the first state but also in the second state as shown in FIG. 8. In the first state, the pair of stopper brackets 241 can be arranged in parallel with each other, similarly to the first frame 210a and second frame 210b. In the second state, the pair of stopper brackets 241 come close to each other but are still spaced apart as shown in FIG. 8. In the third state, the pair of stopper brackets 241 come into direct contact with each other as shown in FIG. 9.

The pair of stopper brackets 241 can include first stoppers 243 and 244 that come into contact with each other in the thickness direction in the open state (third state) and second stoppers 246 that come into contact with each other in the first direction in the open state (third state).

FIG. 10 is a view illustrating the stopper bracket 241 of the portable electronic device 100 according to one aspect of the present disclosure. (a) of FIG. 10 is a rear perspective view of the stopper brackets 241, and (b) of FIG. 10 is a front view of the stopper brackets 241. The stopper brackets 241 shown in FIG. 10 can be attached to each of the first frame 210a and second frame 210b as shown in FIG. 6.

The pair of stopper brackets 241 can be formed by arranging the same type of stopper brackets 241 in the opposite direction by 180 degrees, thereby implementing one angle-limiting module 240.

The stopper bracket 241 of the present disclosure can be attached to the middle frame 210 through screws 248 as shown in FIG. 6. The stopper bracket 241 can include the first stopper 243 and 244 and the second stopper 246 on one side and include screw holes 245 to which the screws 248 to pass on the other side.

Since the pair of stopper brackets 241 are coupled to the first frame 210a and second frame 210b, respectively, the pair of stopper brackets 241 need to be attached to the middle frame 210 without misalignment.

To prevent the stopper bracket 241 from rotating when the stopper bracket 241 is assembled to the middle frame 210 through the screws 248, the stopper bracket 241 can include alignment protrusions 242 to align its attachment position on the middle frame 210. The alignment protrusions 242 are inserted into alignment grooves formed on the middle frame 210 to guide the stopper bracket 241 into the correct position.

In the third state, the first stopper 243 and 244 and second stopper 246 located on one side of one stopper bracket 241 can have a structure where the first stopper 243 and 244 and second stopper 246 align with and come into contact with the paired stopper bracket 241 as shown in FIG. 9.

The first stopper 243 and 244 can include: a stopper hook 243 located on one side of each of the pair of stopper brackets 241 and bent toward one surface of the frame; and a stopper bump 244 located on the other side of each of the pair of stopper brackets 241 and in contact with the stopper hook 243.

One stopper bracket 241 includes both the stopper hook 243 and stopper bump 244, and one angle-limiting module 240 includes two sets of the first stoppers 243 and 244, each of which is composed of the stopper hook 243 and stopper bumps 244.

(a) and (b) of FIG. 11 are views illustrating the second state of the angle-limiting module 240 of the portable electronic device 100 according to one aspect of the present disclosure, and (a) and (b) of FIG. 1S are views illustrating the third state of the angle-limiting module 240 of the portable electronic device 100 according to one aspect of the present disclosure.

In the second state before the third state, the pair of stopper brackets 241 are separated from each other as shown in (a) and (b) of FIG. 11. However, in the third state, the stopper hook 243 comes into contact with the stopper bump 244, and a pair of second stoppers 246 also come into contact with each other as shown in (a) and (b) of FIG. 12.

The stopper hook 243 and stopper bump 244 can be positioned in the second direction (D2) while the second stoppers 246 is positioned in therebetween. Referring to FIG. (b) of FIG. 10, since the stopper hook 243 protrudes (at point c) in one direction, the stopper hook 243 of one stopped bracket 241 comes into contact with the rear surface of the stopper bump 244 of the paired stopper bracket 241 in the third state.

The stopper bump 244 applies force in the rear direction, and the stopper hook 243 applies force in the front direction, achieving a balance of forces therebetween. Since one stopper bracket 241 includes both the stopper bump 244 and stopper hook 243, the stopper brackets 241 maintain a balance of forces in the front and rear directions, thereby allowing the pair of frames to maintain an angle of 180 degrees in the third state.

Referring to (b) of FIG. 10, since the stopper bump 244 and stopper hook 243 create a balance of forces at points a and c in both front and rear directions, that is, in the thickness direction, the connecting portion 130 is no longer folded.

As shown in (b) of FIG. 10, the end of the stopper bump 244 and the end of the stopper hook 243 can be aligned on the same line (d). In other words, the line connecting the ends of the stopper hook 243 and stopper bump 244 is parallel to one surface of the first frame 210a and second frame 210b in the open state (third state).

The second stopper 246 can be positioned (at point b) between the stopper hook 243 and stopper bump 244 in the first direction. In the third state, the second stopper 246 of one stopper bracket 241 comes into contact with the second stopper 246 of the paired stopper bracket 241, thereby supporting the force applied in the first direction. The contacting second stoppers 246 can prevent movement in the first direction caused by the gap between the first frame 210a and second frame 210b, thereby preventing damage to the foldable portion 1515 of the display 151. To support the force in the first direction, the second stopper 246 can have a protrusion in the rear direction (the upper direction in (b) of FIG. 10) such that a supporting surface perpendicular to the first direction has a predetermined width. However, increasing the protrusion of the second stopper 246 can lead to interference with other components.

As shown in FIG. 8, a hinge cover 103 is positioned at the connecting portion 130 between the first frame 210a and second frame 210b and covers the hinge module 230 to prevent the hinge module 230 from being exposed in the first state and the second state. Considering transitioning from the first state to the third state, the second stoppers 246 can protrude within a range where the second stopper 246 does not come into contact with the hinge cover 103 located on the connecting portion 130.

The stopper hook 243 of the first stopper 243 and 244 protrudes further than the second stopper 246. Therefore, even if the second stopper 246 is thicker than the stopper hook 243 in the thickness direction, the second stopper 246 does not come into contact with the hinge cover 103.

According to at least one embodiment of the present disclosure, it is possible to prevent the angle between the pair of frames 210a and 210b from increasing beyond 180 degrees as described above, thereby preventing the foldable portion 1515 of the display 151 from being damaged due to excessive pressure applied in the front direction.

Additionally, it is also possible to prevent damage to the display 151 due to an impact in the first direction by eliminating the gap between the pair of frames 210a and 210b arranged side by side in the first direction.

The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A portable electronic device comprising:
a first frame;
a second frame spaced from the first frame in a first direction when the portable electronic device is in an open state;
a hinge disposed between the first frame and the second frame, the hinge being configured to control an angle between the first frame and the second frame; and
an angle limiter configured to limit the angle between the first frame and the second frame, the angle limiter including a first stopper bracket coupled to the first frame and a second stopper bracket coupled to the second frame,
wherein each of the first stopper bracket and the second stopper bracket includes:

a first stopper; and a second stopper, wherein in the open state, the first stopper of the first stopper bracket comes into contact with the first stopper of the second stopper bracket in a thickness direction, and wherein in the open state, the second stopper of the first stopper bracket comes into contact with the second stopper of the second stopper bracket in the first direction.

2. The portable electronic device of claim 1, wherein each first stopper includes:

a stopper hook; and a stopper bump, wherein the stopper hook of the first stopper bracket comes into contact with the stopper bump of the second stopper bracket, and wherein the stopper hook of the second stopper bracket comes into contact with the stopper bump of the first stopper bracket.

3. The portable electronic device of claim 2, wherein the first stopper of the first stopper bracket is spaced from the first stopper of the second stopper bracket in a second direction perpendicular to the first direction.

4. The portable electronic device of claim 3, wherein the stopper hook of the first stopper bracket protrudes further towards the second stopper bracket than the stopper bump of the first stopper bracket.

5. The portable electronic device of claim 4, wherein a line connecting an end of the stopper hook of the first stopper bracket and an end of the stopper bump of the first stopper bracket is parallel to a first surface of the first frame and the second frame, in the open state.

6. The portable electronic device of claim 3, wherein each second stopper is located between the first stopper of the first stopper bracket and the first stopper of the second stopper bracket.

7. The portable electronic device of claim 3, wherein the first stopper bracket is oriented 180 degrees from the second stopper bracket, and wherein the first stopper bracket has a same shape as the second stopper bracket.

8. The portable electronic device of claim 2, wherein each second stopper includes a supporting surface, wherein the supporting surface of the second stopper of the first stopper bracket comes into contact with the supporting surface of the second stopper of the second stopper bracket in the open state, and wherein the stopper hook of the first stopper bracket protrudes further towards the second stopper bracket than the supporting surface of the second stopper of the first stopper bracket.

9. The portable electronic device of claim 8, wherein each supporting surface protrudes further towards a surface of the first frame and the second frame than each stopper hook.

10. The portable electronic device of claim 1, wherein each of the first stopper bracket and the second stopper bracket further includes:

screw holes for attaching to a respective one of the first frame and the second frame; and alignment protrusions inserted into guide holes formed in the respective one of the first frame and the second frame.

11. The portable electronic device of claim 1, further comprising a flexible display fixed to a first surface of the first frame and fixed to a first surface of the second frame, wherein the flexible display covers a first surface of the hinge and a first surface of the angle limiter, and wherein the flexible display including a foldable portion configured to have a varying curvature.

12. A portable electronic device comprising:

a first frame;

a second frame;

a flexible display fixed to the first frame and fixed to the second frame;

a hinge connected between the first frame and the second frame, the hinge being configured to control an angle between the first frame and the second frame; and an angle limiter configured to limit the angle between the first frame and the second frame, the angle limiter including:

a first stopper bracket coupled to the first frame; and a second stopper bracket coupled to the second frame, wherein each of the first stopper bracket and the second stopper bracket includes a first stopper, wherein the first stopper bracket is configured to be spaced apart from the second stopper bracket in a closed state of the portable electronic device, and wherein the first stopper of the first stopper bracket is configured to come into contact in a thickness direction with the first stopper of the second stopper bracket in an open state of the portable electronic device.

13. The portable electronic device of claim 12, wherein each of the first stopper bracket and the second stopper bracket includes a second stopper.

14. The portable electronic device of claim 13, wherein the second stopper of the first stopper bracket comes into contact with the second stopper of the second stopper bracket in a first direction in the open state, and wherein the first frame is spaced from the second frame in the first direction.

15. The portable electronic device of claim 13, wherein each first stopper includes:

a stopper hook; and a stopper bump, wherein the stopper hook of the first stopper bracket comes into contact with the stopper bump of the second stopper bracket, and wherein the stopper hook of the second stopper bracket comes into contact with the stopper bump of the first stopper bracket.

16. The portable electronic device of claim 15, wherein for each of the first stopper bracket and the second stopper bracket, the second stopper is positioned between the stopper hook and the stopper bump.

17. The portable electronic device of claim 16, wherein the second stopper of the first stopper bracket comes into contact the second stopper of the second stopper bracket in the open state.

18. The portable electronic device of claim 12, wherein the first stopper bracket is oriented 180 degrees from the second stopper bracket, and wherein the first stopper bracket has a same shape as the second stopper bracket.

19. The portable electronic device of claim 13, wherein each second stopper includes a supporting surface, wherein the supporting surface of the second stopper of the first stopper bracket comes into contact with the supporting surface of the second stopper of the second stopper bracket in the open state, and wherein a stopper hook of the first stopper bracket protrudes further towards the second stopper bracket than the supporting surface of the second stopper of the first stopper bracket.

20. The portable electronic device of claim 12, wherein each of the first stopper bracket and the second stopper bracket further includes:

screw holes for attaching to a respective one of the first frame and the second frame; and alignment protrusions inserted into guide holes formed in the respective one of first frame and the second frame.

\* \* \* \* \*